(12) United States Patent
Ko et al.

(10) Patent No.: US 11,485,267 B2
(45) Date of Patent: Nov. 1, 2022

(54) CUP HOLDER FOR VEHICLE

(71) Applicants: Hyundai Motor Company, Seoul (KR); Kia Motors Corporation, Seoul (KR); NIFCO KOREA Inc., Asan-si (KR); HYUNDAI TRANSYS INC., Seosan-si (KR)

(72) Inventors: Hyun Ko, Suwon-si (KR); Sang Hark Lee, Incheon (KR); Hoon Bok Lee, Hwaseong-si (KR); Won Sang Cho, Asan-si (KR); Hyun Kim, Hwaseong-si (KR); Hyeok Song, Hwaseong-si (KR)

(73) Assignees: Hyundai Motor Company, Seoul (KR); Kia Motors Corporation, Seoul (KR); NIFCO KOREA Inc., Asan-si (KR); HYUNDAI TRANSYS INC., Seosan-si (KR)

( * ) Notice: Subject to any disclaimer, the term of this patent is extended or adjusted under 35 U.S.C. 154(b) by 6 days.

(21) Appl. No.: 17/089,226

(22) Filed: Nov. 4, 2020

(65) Prior Publication Data
US 2021/0146817 A1    May 20, 2021

(30) Foreign Application Priority Data
Nov. 14, 2019 (KR) .......................... 10-2019-0145971

(51) Int. Cl.
*B60N 3/10* (2006.01)
*B60N 2/75* (2018.01)

(52) U.S. Cl.
CPC .............. *B60N 3/106* (2013.01); *B60N 2/79* (2018.02)

(58) Field of Classification Search
CPC .................................. B60N 3/106; B60N 2/79

USPC ....................................................... 296/37.15
See application file for complete search history.

(56) References Cited

U.S. PATENT DOCUMENTS

| 5,072,989 | A | * | 12/1991 | Spykerman | A47C 7/62 |
| | | | | | 297/188.19 |
| 5,131,716 | A | * | 7/1992 | Kwasnik | B60N 3/106 |
| | | | | | 248/311.2 |
| 8,911,011 | B2 | * | 12/2014 | Andersson | B60N 3/102 |
| | | | | | 297/188.17 |
| 2005/0269919 | A1 | * | 12/2005 | Sambommatsu | B60N 3/102 |
| | | | | | 312/319.5 |
| 2014/0191529 | A1 | * | 7/2014 | Okuhara | B60N 3/102 |
| | | | | | 296/37.15 |
| 2016/0059761 | A1 | * | 3/2016 | Bohlke | B60N 3/102 |
| | | | | | 296/37.8 |

(Continued)

FOREIGN PATENT DOCUMENTS

| CN | 113103935 A | * | 7/2021 | |
| JP | 2001199272 A | * | 7/2001 | ............. B60N 3/102 |

*Primary Examiner* — Hilary L Gutman

(57) ABSTRACT

A cup holder for a vehicle may include a holder body slidably coupled to a cup holder mounting portion in the vehicle, a finger elastically and pivotably mounted to the holder body, and configured to press and support a side surface of a cup inserted into the cup holder together with the holder body, a support connected to the holder body by a link such that the support is vertically movable in accordance with pivotal movement of the link, the support being configured to support a bottom portion of the cup, and a locking member disposed between the finger and the link, to lock the link, for prevention of pivotal movement of the link, or to unlock the link in linkage with pivotal operation of the finger.

14 Claims, 9 Drawing Sheets

(56) References Cited

U.S. PATENT DOCUMENTS

2016/0362029 A1* 12/2016 Masatsugu ............. B60N 3/102

* cited by examiner (Area 'A')

Support Fixed:
Prevention of Cup Separation

CUP HOLDER FOR VEHICLE

CROSS-REFERENCE TO RELATED APPLICATION

The present application claims priority to Korean Patent Application No. 10-2019-0145971 filed on Nov. 14, 2019, the entire contents of which is incorporated herein for all purposes by this reference.

BACKGROUND OF THE INVENTION

Field of the Invention

The present invention relates to a cup holder, and more particularly to a cup holder for a vehicle, which can hold a cup in the vehicle by receiving the cup.

Description of Related Art

Generally, a seat is mounted in a vehicle such that a passenger may be accommodated on the seat. The seat of the vehicle includes a seat cushion for supporting the lower body of the passenger, a seatback for supporting the upper body of the passenger, and a headrest for supporting the head and neck of the passenger.

Furthermore, mounted at the seat of the vehicle are an armrest, on which a passenger's arm can rest, a cup holder configured for holding a beverage container such as a can or a cup (hereinafter collectively referred to as a "cup"), a recliner for adjusting an angle of the seatback in forward and rearward directions, and a position adjuster for adjusting a position of the seat in forward and rearward directions.

FIG. 1 is a view showing an example in which a conventional cup holder is mounted at a vehicle seat. FIG. 1 shows a problem encountered in a conventional slidable cup holder 5.

The cup holder 5 shown in FIG. 1 is mounted at an armrest 4 of a seat 1 such that the cup holder 5 may be inserted into an interior of the armrest 4 or may be withdrawn forwards from the armrest 4 in accordance with sliding movement thereof along the armrest 4. For use thereof, the cup holder 5, which has been received in the interior of the armrest 4 in an unused state, is withdrawn forwards from the armrest 4 in a slidable manner.

FIG. 1 shows use of the cup holder 5. In FIG. 1, the cup holder 5 is in a state of protruding forwards from the armrest 4 of the seat 1 through sliding movement thereof. FIG. 1 shows a state in which a cup 10 is received in the cup holder 5.

The cup holder 5, which is of a slidable insertion type, may secure a greater space of the armrest 4 for arm support and holding, as compared to a cup holder fixed at one side of an upper portion of the armrest while having an open structure.

That is, in the case in which an open type cup holder is fixed at one side of the upper portion of the armrest, the cup holder is always maintained at a fixed position, and accordingly, occupies a certain area on the upper portion of the armrest. For the present reason, the area allowing the arm of the user to be supported and held by the armrest is reduced by the area occupied by the cup holder.

On the other hand, the slidable insertion type cup holder 5 is withdrawn forwards from the armrest 4 in use thereof. Accordingly, the armrest may always secure a space for supporting and holding the arm of the user, irrespective of whether or not the cup holder 5 is used.

In a general case, the slidable insertion type cup holder 5, which may be inserted into the interior of the armrest 4, includes a plate-shaped holder body slidably coupled to the armrest 4 such that the holder body may be inserted into the interior of the armrest 4 or may be withdrawn forwards from the armrest 4.

Furthermore, fingers 7 are elastically pivotably mounted to the holder body 6 through springs. When a cup 10 is inserted into the cup holder 5, the fingers 7 are pivotally moved in a predetermined direction (a divergence direction) against resilience of the springs. On the other hand, when the cup 10 is held in the cup holder 5, resilience of the springs is exerted on the fingers 7, and accordingly, the fingers 7 laterally press and support the cup 10.

Furthermore, a support 8 is vertically movably mounted at the holder body 6 to support a bottom portion of the cup 10. The support 8 is connected to the holder body 6 by a link 9. The support 8 is vertically movable in accordance with pivotal movement of the link 9.

When the cup holder 5 is inserted into the armrest 4, the support 8 is in a state of being raised to a position where the support 8 is insertable into the armrest 4. In use thereof, the support 8 is deployed downwards, and accordingly, is positioned at a position where the support 8 can support the cup 10.

Hereinafter, a problem encountered in the conventional case will be described with reference to FIG. 1. When the seat back 2 is rotated forwards during a walk-in operation of the seat 1 in a use state of the cup holder 5 in which the cup 10 is held in the cup holder 5, the armrest 4 and the cup holder 5 withdrawn forwards from the armrest 4 are moved together downwards.

When the seatback 2 is further rotated, the cup holder 5 is further moved downwards, and accordingly, the support 8 of the cup holder 5 supporting the cup 10 and the seat cushion 3 come into contact with each other (occurrence of interference). Subsequently, the support 8 of the cup holder 5 is pressed upwards by the seat cushion 3 in a state in which the support 8 is in contact with the seat cushion 3.

In the instant case, the support 8 is raised as the support 8 is pushed upwards by the seat cushion 3 in a state of supporting the cup 10. Upon rising, the support 8 lifts the cup 10 upwards. As a result, the insertion depth of the cup 10 becomes insufficient, and accordingly, the cup 10 may be separated from the holder body 6 and the fingers 7.

As a result, the contents of the cup 10 may be spilled, and accordingly, the vehicle and the seat may be contaminated by the spilled contents. In the case in which hot liquid is contained in the cup 10, the passenger may be scalded.

FIG. 2 is a view showing a state in which the support 8 of the cup holder 5 receives upward force F by the seat cushion 3 when the seatback 2 is further rotated under the condition that the support 8 is in contact with the seat cushion 4.

As shown in FIG. 2, when the support 8 of the cup holder 5 is pressed upwards by the seat cushion 3, the link 9 is moved, causing the support 9 to move upwards. As a result, the cup 10 on the support 8 may be separated from the cup holder 5, causing the contents of the cup 10 to be spilled.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cup holder for a vehicle, which is configured for preventing a support of the cup holder from moving upwards in a state in which a cup is laid on the support, even when the support comes into contact with a seat cushion during a walk-in operation of a seat, solving separation of the cup caused by upward movement of the support.

Various aspects of the present invention are directed to providing a cup holder for a vehicle including a holder body slidably coupled to a cup holder mounting portion in the vehicle, a finger elastically and pivotably mounted to the holder body, and configured to press and support a side surface of a cup inserted into the cup holder together with the holder body, a support connected to the holder body by a link such that the support is vertically movable in accordance with pivotal movement of the link, the support being configured to support a bottom portion of the cup, and a locking member mounted between the finger and the link, to lock the link, for prevention of pivotal movement of the link, or to unlock the link in linkage with pivotal operation of the finger.

In various exemplary embodiments of the present invention, the finger may be coupled to the locking member by a gear structure configured to convert pivoting force of the finger into linear movement force of the locking member or to convert linear movement force of the locking member into pivoting force of the finger.

In another exemplary embodiment of the present invention, a first tooth portion may be formed in a circumferential direction at a hinge coupling portion of the finger pivotally coupled to the holder body. A second tooth portion may be formed in a linear direction at the locking member such that the second tooth portion is gear-engaged with the first tooth portion of the finger. The locking member may be linearly moved to a position locking the link in accordance with pivoting of the finger in a state in which the first tooth portion and the second tooth portion are gear-engaged with each other.

In yet another exemplary embodiment of the present invention, a spring may be mounted between the hinge coupling portion of the finger and the holder body, to elastically pivot the finger. When a cup received in the cup holder is removed in a state in which the spring has been deformed in accordance with pivoting of the finger for reception of the cup, the spring may elastically pivot the finger in a reverse direction thereof, and at the same time, may provide elastic resilience to move the locking member to an unlocking position.

In yet another exemplary embodiment of the present invention, a spring may be mounted between the locking member and the holder body, to provide elastic resilience to move the locking member to an unlocking position in a state in which the spring has been deformed by the locking member moving to a locking position.

In still yet another exemplary embodiment of the present invention, an elongated guide pin may be formed at the locking member. The spring may be mounted at the guide pin such that the spring is supported, at one end portion thereof, by the locking member while being supported, at the other end portion thereof, by the holder body.

In still yet another exemplary embodiment of the present invention, the guide pin may be coupled to a guide protrusion formed at the holder body while passing through the guide protrusion. The spring mounted at the guide pin may be supported, at one end portion thereof, by the locking member while being supported, at the other end portion thereof, by the guide protrusion of the holder body.

In still yet another exemplary embodiment of the present invention, a stopper may be formed at one side of the locking member. When the locking member moves to a locking position, the stopper of the locking member may be moved to a position where the stopper comes into contact with an end portion of the link pivoting in a pivoting direction thereof, to prevent pivoting of the link, causing the link to be locked.

In still yet another exemplary embodiment of the present invention, the stopper of the locking member may be moved to a position where the stopper comes into contact with a tip portion of one end portion of the link pivotally coupled to the holder body, bring the tip portion of the link into contact with the stopper of the locking member in a locked state of the link.

In still yet another exemplary embodiment of the present invention, the link may be pivotally coupled, at one end portion thereof, to the holder body. The link may be coupled, at the other end portion thereof, to the support. The stopper of the locking member may move to a position under a side surface of a sector gear formed at the tip portion of one end portion of the link, bring the side surface of the sector gear into contact with the stopper of the locking member in the locked state of the link.

In still yet another exemplary embodiment of the present invention, the cup holder mounting portion in the vehicle may be an armrest end portion of a seat in the vehicle.

In still yet another exemplary embodiment of the present invention, the finger, the support, the locking member, and the holder body may have corresponding configurations of a slidable insertion type cup holder, respectively such that the finger, the support, the locking member, and the holder body are inserted into an interior of the armrest end portion of the seat through sliding movement thereof, or are withdrawn forwards from the armrest end portion through sliding movement thereof.

Other aspects and exemplary embodiments of the present invention are discussed infra.

It is understood that the terms "vehicle", "vehicular" and other similar terms as used herein are inclusive of motor vehicles in general such as passenger vehicles including sport utility vehicles (SUVs), buses, trucks, various commercial vehicles, watercraft including a variety of boats and ships, aircraft, and the like, and includes hybrid electric vehicles, electric vehicles, plug-in hybrid electric vehicles, hydrogen-powered vehicles and other alternative fuel (e.g., fuels derived from resources other than petroleum) vehicles. As referred to herein, a hybrid electric vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
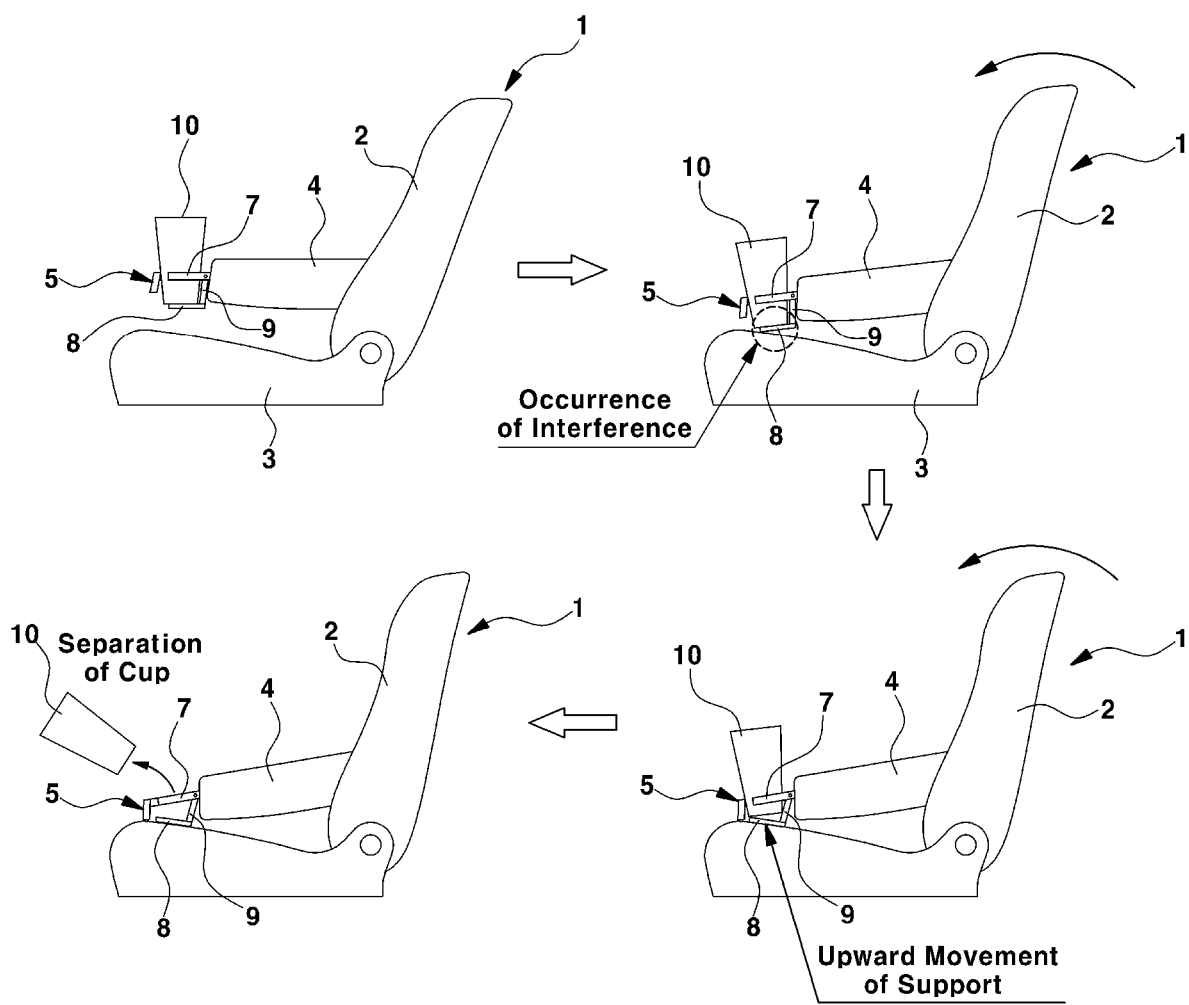
FIG. 1 and FIG. 2 are views explaining problems encountered in a conventional slidable insertion type cup holder.
Figure 2:
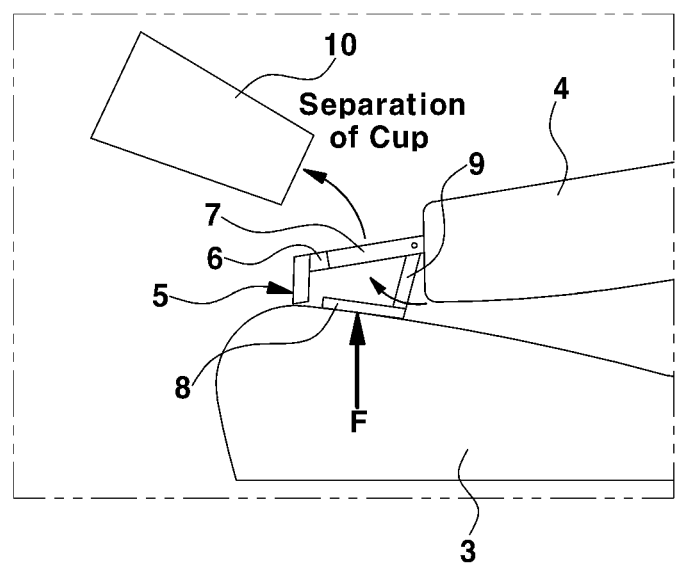

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the accompanying drawings, and accordingly, may be easily implemented by one of ordinary skill in the art to which various exemplary embodiments of the present invention pertains. However, the present invention may be embodied in various forms and may not be construed as limited to the exemplary embodiments set forth herein.

The terms "including", "comprising", "having" and variations thereof disclosed herein mean "including but not limited to" unless expressly specified otherwise, and then, should not be construed to exclude elements other than the elements disclosed herein and should be construed to further include additional elements.

The present invention relates to a cup holder for a vehicle. The present invention has an essential point of improving a conventional slidable insertion type cup holder to prevent a support of the cup holder from moving upwards in a state in which a cup is laid on the support, even when the support comes into contact with a seat cushion during a walk-in operation of a seat, solving separation of the cup caused by upward movement of the support.

The cup holder of the present invention may be a slidable insertion type cup holder for an armrest, which is withdrawn forwards from an end portion of the armrest through sliding movement thereof in use or is inserted into the end portion of the armrest through sliding movement thereof in a reverse direction if not in use.

Hereinafter, a configuration of a cup holder according to various exemplary embodiments of the present invention will be described in detail with reference to the accompanying drawings.

Figure 3:
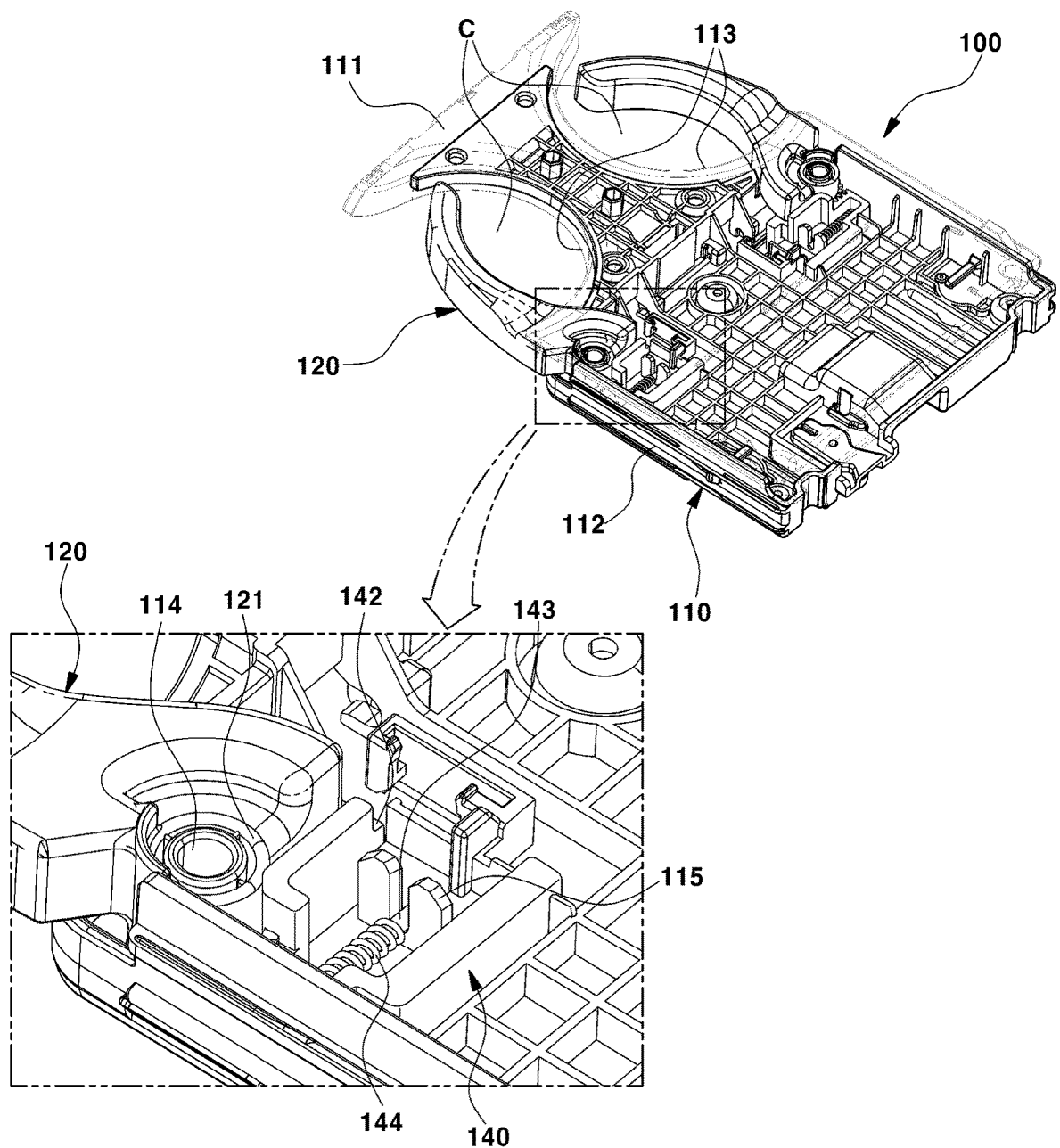
FIG. 3 is a perspective view exemplarily illustrating a configuration of a cup holder for a vehicle according to various exemplary embodiments of the present invention.

FIG. 3 is a perspective view exemplarily illustrating a configuration of a cup holder for a vehicle according to various exemplary embodiments of the present invention. In FIG. 3, an upper portion ("111" in FIG. 4A) of a holder body 110 is shown in a transparent state to enable elements mounted in the interior of the holder body 110 to be viewed.

Furthermore, a support ("130" in FIG. 7) and a link ("131a" in FIG. 7) are omitted from FIG. 3.

Figure 4A:
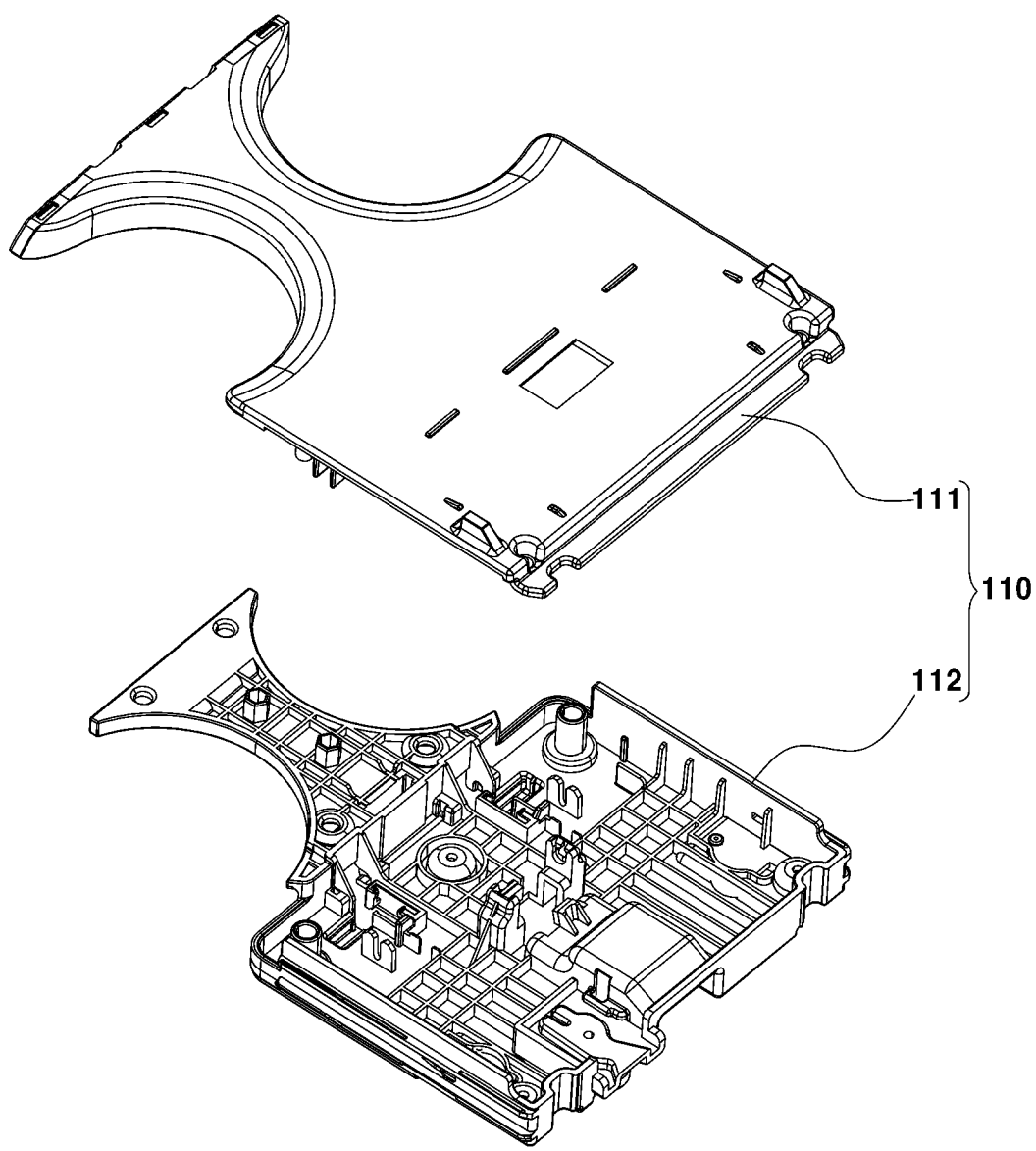
FIG. 4A is a perspective view exemplarily illustrating a holder body included in the cup holder according to the exemplary embodiment of the present invention.
Figure 4B:
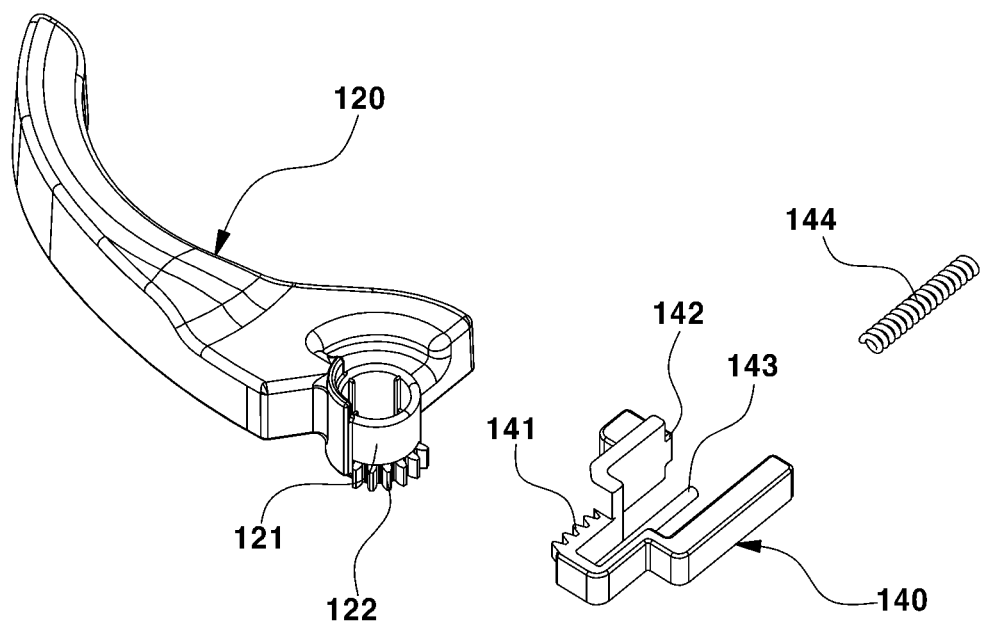
FIG. 4B is a perspective view exemplarily illustrating a finger, a locking member and a spring included in the cup holder according to the exemplary embodiment of the present invention.

FIG. 4A is an exploded perspective view exemplarily illustrating a configuration of the holder body 110 included in the cup holder according to the exemplary embodiment of the present invention, that is, a cup holder 100. FIG. 4B is a perspective view exemplarily illustrating a finger 120, a locking member 140 and a spring 144 included in the cup holder 100 according to the exemplary embodiment of the present invention.

Figure 5:
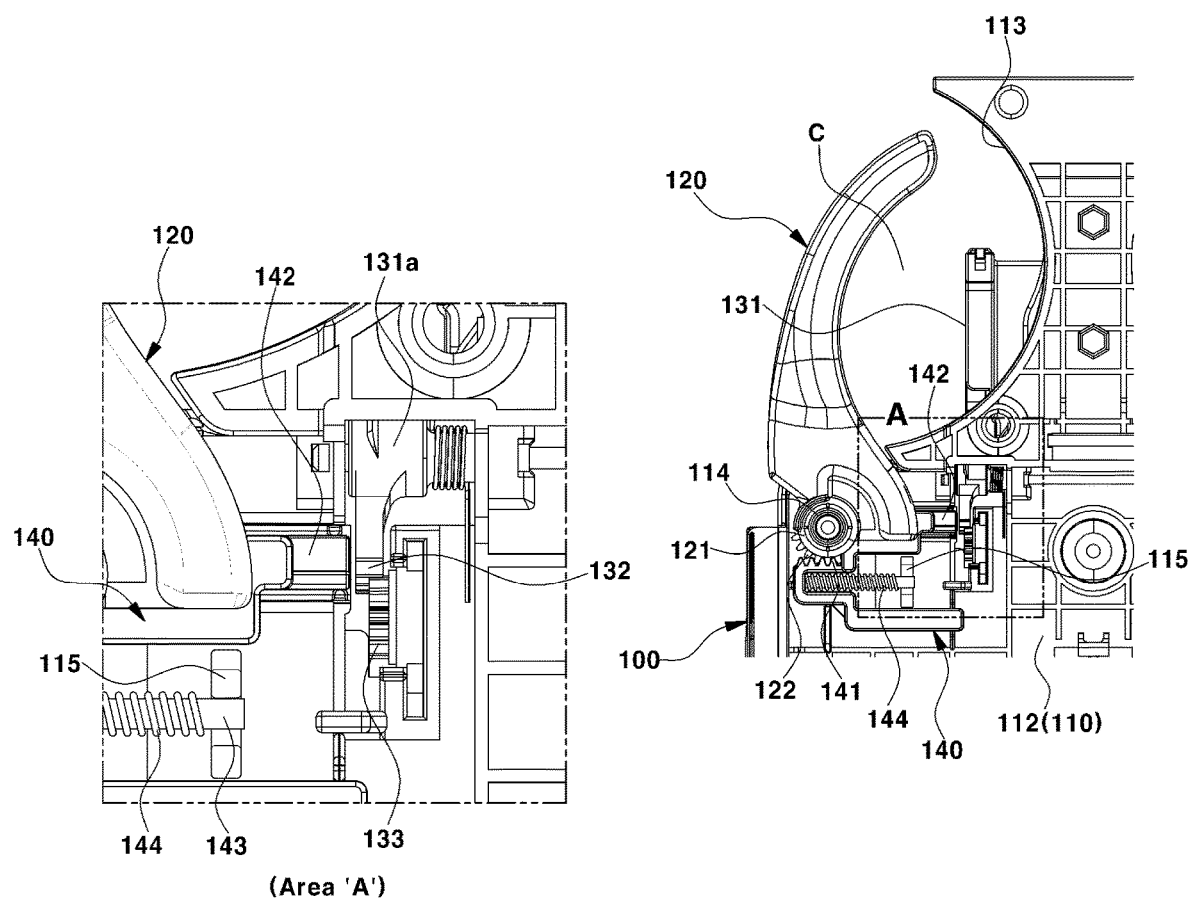
FIG. 5 is a view showing a cup-unused state of the cup holder according to the exemplary embodiment of the present invention.
Figure 6:
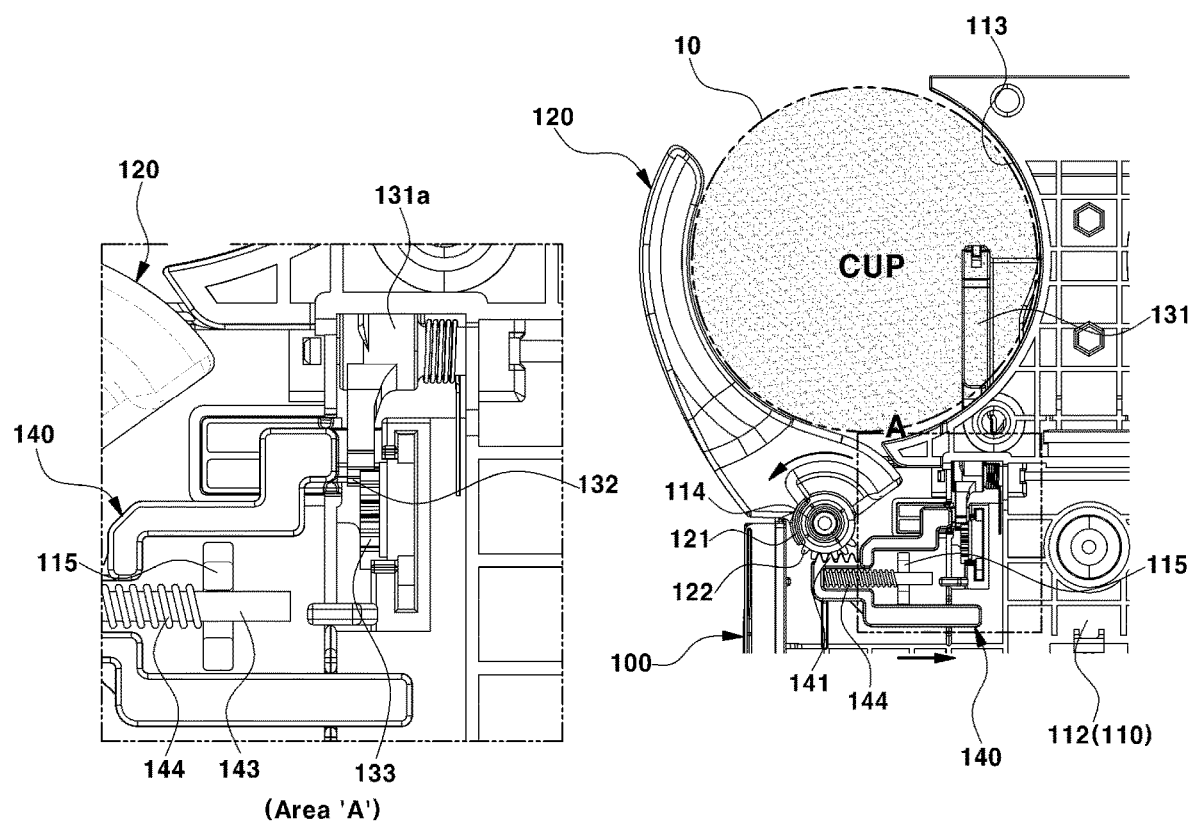
FIG. 6 is a view showing a state in which a cup is inserted into the cup holder according to the exemplary embodiment of the present invention.

FIG. 5 is a view showing a cup-unused state of the cup holder 100 according to the exemplary embodiment of the present invention. FIG. 6 is a view showing a state in which a cup 10 is inserted into the cup holder 100 according to the exemplary embodiment of the present invention.

Figure 7:
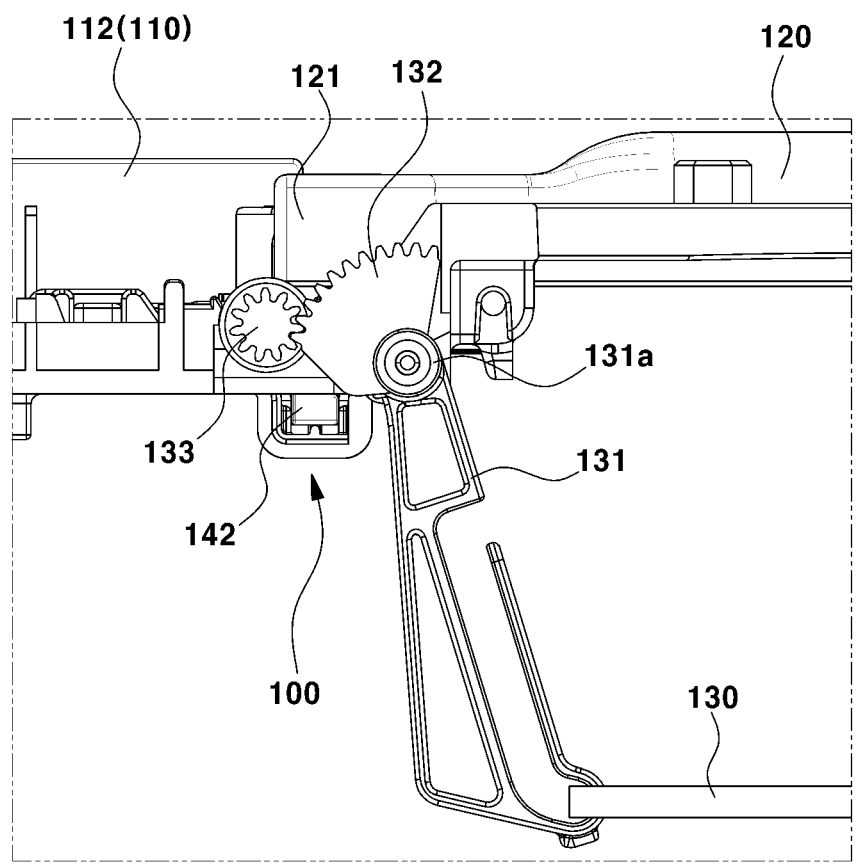
FIG. 7 is a side view showing a locked state in which pivotal movement of a link is prevented by the locking member in the cup holder according to the exemplary embodiment of the present invention.
Figure 8:
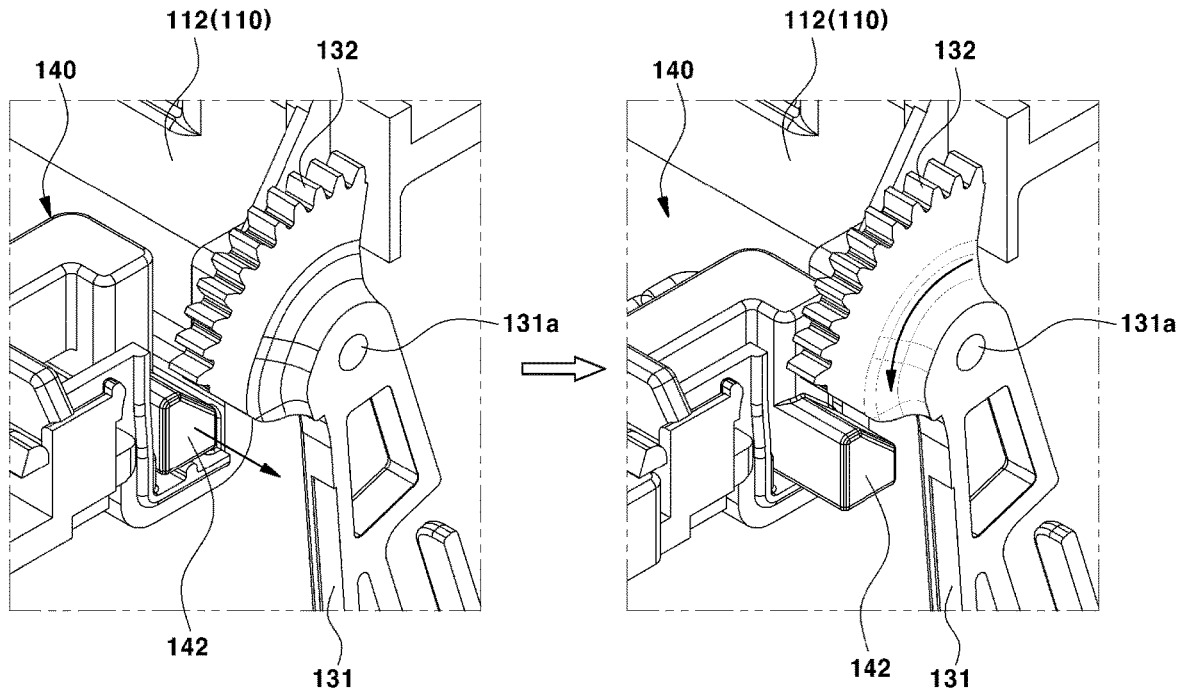
FIG. 8 is a perspective view showing a state in which pivotal movement of the link is prevented in accordance with position change of a stopper of the locking member in the cup holder according to the exemplary embodiment of the present invention.

FIG. 7 is a side view showing a locked state in which pivotal movement of a link 131 is prevented by the locking member 140 in the cup holder 100 according to the exemplary embodiment of the present invention. FIG. 8 is a perspective view showing a state in which pivotal movement of the link 131 is prevented in accordance with position change of a stopper 142 of the locking member 140 in the cup holder 100 according to the exemplary embodiment of the present invention.

Figure 9:
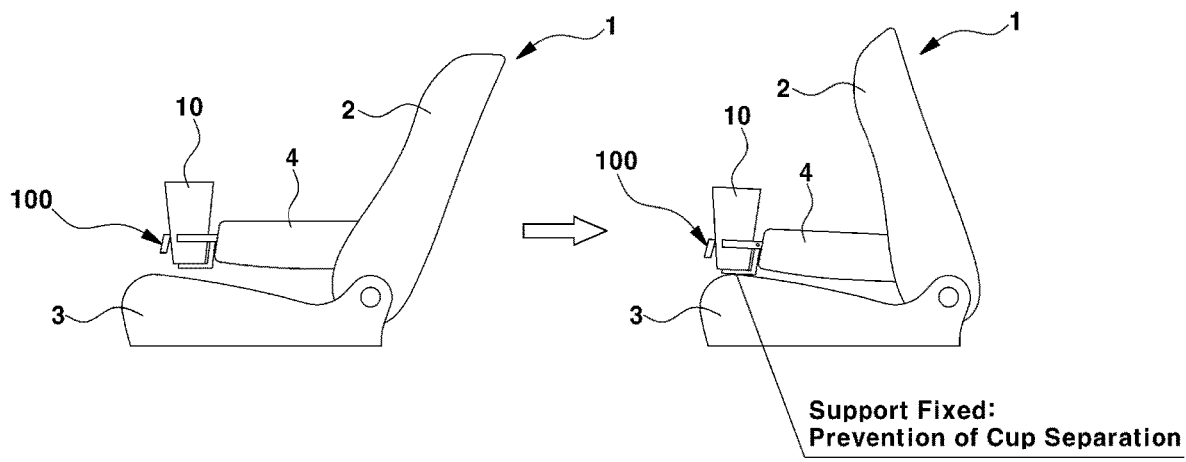
FIG. 9 is a view showing a walk-in operation of a seat to which the cup holder according to the exemplary embodiment of the present invention is applied.

Furthermore, FIG. 9 is a view showing a walk-in operation of the seat 1 to which the cup holder 100 according to the exemplary embodiment of the present invention is applied.

The cup holder 100 according to the exemplary embodiment of the present invention includes the holder body 110, which is slidably coupled to a cup holder mounting portion of a seat 1, and fingers 120 elastically pivotably mounted to the holder body 110, to press and support a side surface of a cup 10 inserted into the cup holder 100 together with the holder body 110. The cup holder 100 further includes a support 130 connected to the holder body 110 by the link 131 such that the support 130 is perpendicularly movable in accordance with pivotal movement of the link 131. The support 130 is configured to support a bottom portion of the cup 10. The cup holder 100 further includes locking members 140 each mounted between a corresponding one of the fingers 120 and the link 131, to lock the link 131 of the support 130, for prevention of pivotal movement of the link 131, or to unlock the link 131 in linkage with pivotal operation of the finger 120.

In the instant case, the holder body 110 may have a plate shape. The holder body 110 may have a configuration including a combination of two plates disposed perpendicularly.

That is, the holder body 110 may include an upper body 111 having a plate shape and a lower body 112 having a plate shape. The upper body 111 and the lower body 112 are coupled to each other to form the holder body 110, which has an integrated structure.

The holder body 110 is mounted to a cup holder mounting area in the vehicle, that is, the cup holder mounting portion of the seat 1 such that the holder body 110 is horizontally slidable. In the instant case, the cup holder mounting portion of the seat 1 may be an end portion of an armrest 4 in the seat 1.

A sliding mechanism may be employed to enable the holder body 110 to be inserted into an interior of the armrest 4 at the end portion of the armrest 4 in the seat 1 or to be withdrawn forwards from the armrest 4. The present sliding mechanism is known technology applied to known slidable insertion type cup holders, and accordingly, no detailed description thereof will be given.

As illustrated in FIG. 3, a total of two receiving spaces C may be provided at left and right sides of the holder body 110, respectively. Cups 10 may be received in the two receiving spaces C, respectively. To this end, arc-shaped receiving grooves 113 are formed at left and right sides portions of the holder body 110, respectively such that each receiving groove 113 may receive at least a portion of each cup 10, and accordingly, a side surface portion of the cup 10 may be accommodated on and supported by an internal surface of the receiving groove 113.

Furthermore, the fingers 120 are mounted to the holder body 110 at opposite sides of the receiving grooves 113, respectively such that the fingers 120 are elastically pivotable in respective internal spaces of the receiving grooves 113, that is, respective receiving spaces C of the holder body 110 for receiving cups 10.

Assuming that the holder body 110 slides horizontally in forward and rearward directions with respect to the armrest 4, the left and right fingers 120 may be disposed to pivot horizontally in an elastic manner within respective receiving spaces C of the holder body 110.

An end portion of each finger 120 is pivotally coupled to an interior of the holder body 110. As may be seen from an enlarged view of FIG. 3, a hinge coupling portion 121 formed at the end portion of the finger 120 is fitted around a hinge shaft 114 formed in the interior of the holder body 110 (an interior of the lower body 112) to protrude. Accordingly, the finger 120 may pivot about the hinge shaft 114 of the holder body 110.

In accordance with the above-described configuration, the finger 120 pivots about the hinge shaft 114 in a direction in which the finger 120 is diverged outwards in the corresponding cup receiving space C of the holder body 110 when a cup 10 is received in the cup receiving space C or in a reverse direction in which the finger 120 is converged inwards in the cup receiving space C when the cup 10, which has been received in the cup receiving space C, is removed.

Each finger 120 may be coupled to a corresponding one of the locking members 140 by a gear structure to convert pivoting force of the finger 120 into linear movement force of the locking member 140 or to convert linear movement force of the locking member 140 into pivoting force of the finger 120.

That is, as shown in FIG. 4B, a first tooth portion 122 having a sector gear shape is formed at the end portion of each finger 120, in detail, the hinge coupling portion 121 formed at the end portion of the finger 120. Teeth are formed at the first tooth portion 122 in a circumferential direction thereof.

Meanwhile, the locking members 140 are disposed for the left and right fingers 120, respectively. Each locking member 140 is disposed inside the holder body 110, to be slidable in forward and rearward directions.

When a total of two fingers 120 is disposed at left and right sides of one holder body 110, respectively, as described above, a total of two locking members 140 is disposed at the left and right sides of the holder body 110 in a state of being coupled to the corresponding fingers 120, respectively.

Forward and rearward movement of each locking member 140 is guided by a guide protrusion 115 protruding from an internal surface of the holder body 110, for example, an internal surface of the lower body 112.

In the above description, the left and right locking members 140 have been referred to as being disposed inside the holder body 110 to be slidable in forward and rearward directions. Here, forward and rearward sliding movement of the left and right locking members 140 means that the locking members 140 move in left and right directions with respect to the holder body 110, respectively.

The locking members 140 are constituent elements configured to prevent the link 131 of the support 130 from moving (that is, pivoting) or to release the link 131 to be movable in linkage with operation of the fingers 120. A second tooth portion 141 having a rack shape is formed at a side surface of each locking member 140. Teeth are formed at the second tooth portion 141 to be disposed in forward and rearward linear directions.

The second tooth portion 141 of each locking member 140 may be configured by forming teeth to be disposed along a side surface of the locking member 140 in forward and rearward linear directions. The second tooth portion 141 of the locking member 140 is engaged with the first tooth portion 122 of the corresponding finger 120.

The first tooth portion 122 of each finger 120 has a gear shape with teeth disposed in a circumferential direction thereof, similarly to a pinion, whereas the second tooth portion 141 of each locking member 140 has a gear shape with teeth disposed in a linear direction thereof, similarly to a rack. Accordingly, when each finger 120 pivots, the locking member 140 engaged with the finger 120 is linearly moved.

A stopper 142 is formed at one end portion of each locking member 140. The stopper 142 is a portion of the locking member 140 to selectively lock or unlock the link 131 in accordance with a position of the locking member 140.

The stopper-142 of each locking member 140 locks the link 131 when the corresponding finger 120 is in a state of pivoting to a cup receiving position, preventing the link 131 from rotating in a support lifting direction thereof.

Locking and unlocking of the link 131 conducted by the stoppers 142 of the locking members 140 will be described later in more detail.

Springs 144 are disposed at respective locking members 140 such that each spring 144 operates between the corresponding locking member 140 and the holder body 110. Each spring 144 is configured to elastically operate the corresponding locking member 140 and the corresponding finger 120 coupled to the locking member 140.

Each spring 144 is coupled to a guide pin 143 formed at the corresponding locking member 140 such that the spring 144 extends lengthily. The guide pin 143 is coupled to a guide protrusion 115 formed at the internal surface of the holder body 110 (that is, the internal surface of the lower body 112) while passing through the guide protrusion 115.

In the instant case, the spring 144 disposed at the guide pin 143 is supported, at one end portion thereof, by an internal surface of the corresponding locking member 140 while being supported, at the other end portion thereof, by the guide protrusion 115 of the holder body 110.

The guide protrusion 115 supporting the spring 144 in the holder body 110 functions as a spring seat. When the locking member 140 slides in forward and rearward directions while being guided by the guide protrusion 115 of the holder body 110, the spring 144 is compressed or recovered by the locking member 140.

Elastic resilience of the spring 144 acts as force to move the locking member 140 in a rearward direction thereof. In detail, elastic resilience of the spring 144 acts as force to move the locking member 140 in a link unlocking direction thereof.

Furthermore, as shown in FIG. 5, resilience of the springs 144 acts as force to return the left and right fingers 120 to initial positions, that is, force to pivot the fingers 120 in directions in which the fingers 120 are converged in the holder body 110.

In another exemplary embodiment of the present invention, each spring may be disposed at the hinge coupling portion 121 of the corresponding finger 120, in place of installation of the spring between the corresponding locking member 140 and the holder body 110. In the instant case, the spring is disposed between the finger 120 and the holder body 110 at the corresponding hinge coupling portion 121, to elastically pivot the finger 120.

In the instant case, the spring is deformed by the finger 120 pivoting in a diverging direction thereof, for reception of a cup, and provides elastic resilience to pivot the finger 120 in a converging direction when the cup is removed.

Meanwhile, the support 130 is provided to support the bottom portion of the cup 10 received in the receiving space C between each finger 120 and the holder body 110. The support 130 is coupled to the holder body 110 by the link 131 such that the support 130 is vertically movable.

In the instant case, the link 131 may be pivotally coupled, at one end portion thereof, to the holder body 110 while being pivotally coupled, at the other end portion thereof, to the support 130. Accordingly, when the support 130 moves vertically, the link 131 pivots about hinge coupling portions thereof for the holder body 110 and the support 130.

When the cup holder 100 is inserted into the armrest 4, the support 130 is moved upwards to be positioned at a position allowing insertion. In use of the cup holder 100, the support 130 is deployed downwards to be positioned at a position where the support 130 can support the cup 10.

Furthermore, a sector gear 132 is formed at each tip portion of one end portion of the link 131 pivotally coupled to the holder body 110. The sector gear 132 is engaged with a damping gear 133 rotatably mounted to the holder body 110.

The support 130, the link 131, the sector gear 132 formed at the link 131, and the damping gear 133 mounted to the holder body 110 in the exemplary embodiment of the present invention are well-known, and accordingly, no detailed description thereof will be given.

A side surface of the sector gear 132 formed at one end portion of the link 131 is a portion to be locked by the stopper 142 of the corresponding locking member 140. When the locking member 140 moves to a locking position, the stopper 142 of the locking member 140 moves forwards to be positioned under the sector gear 132 of the link 131, as shown in FIG. 8.

When the stopper 142 of the locking member 140 is positioned under the sector gear 132 of the link 131, the side surface of the sector gear 132 is in contact with the stopper 142. Accordingly, the link 131 is in a locked state in which the link 131 is prevented from pivoting about a hinge coupling portion 131a thereof in a counterclockwise direction thereof, as shown in FIG. 8.

That is, the stopper 142 of the locking member 140 contacts with the side surface of the sector gear 132 to prevent pivotal movement of the link 131. As shown in FIGS. 7 and 8, the support 130 coupled to a lower end portion of the link 131 cannot move upwards when the side surface of the sector gear 132 contacts with the stopper 142, because the link 131 no longer pivots in the counterclockwise direction thereof.

Thus, the stopper 142 of the locking member 140 moves to a position where the stopper 142 contacts with the end portion of the link 131 pivoting in the counterclockwise direction thereof, preventing further pivotal movement of the link 131, and accordingly, locks the link 131.

A left figure of FIG. 8 shows a state before locking and an unlocking state. The shown state is a state before the stopper 142 of the locking member 140 moves to be positioned under the sector gear 132 or a state in which the stopper 142 of the locking member 140 is withdrawn rearwards from the position under the sector gear 132. In the instant state, the link 131 can pivot about the hinge coupling portion 131a thereof for the holder body 110 in the counterclockwise direction thereof.

Furthermore, the present state is a state in which the finger 120 has pivoted toward the interior of the receiving space C, as shown in FIG. 5. The present state may correspond to an initial state before the finger 120 is diverged after withdrawal of the holder body 110 out of the armrest 4 or a state in which the finger 120 has again pivoted toward the interior of the receiving space C after removal of the cup 10 from the cup holder 100. In the instant state, it may be possible to move the support 130 upwards by pivoting the link 131 because the locking member 140 is positioned at the unlocking position.

When the support 130 is moved upwards after removal of the cup 10, as described above, it may be possible to again insert the holder body 110 into the interior of the armrest 4.

A right figure of FIG. 8 and FIG. 6 show a state in which the cup 10 is received in the receiving space C after divergence of the finger 120. When the finger 120 is diverged for reception of the cup 10, the locking member 140 is moved to the locking position in linkage with pivotal movement of the finger 120. In the instant case, the stopper 142 of the locking member 140 is moved to a position under the sector gear 132 of the link 131, as shown in the figures.

When the stopper 142 of the locking member 140 is positioned under the sector gear 132, as described above, the link 131 is prevented from pivoting about the hinge coupling portion 131a for the holder body 110 in the counterclockwise direction thereof, when viewed in the figures, because the stopper 142 is in contact with the sector gear 132.

Thus, the support 130 cannot move upwards in a state in which the cup 10 is received.

Hereinafter, operation of the cup holder will be described in more detail with reference to the accompanying drawings.

First, when the user diverges one finger 120 by pivoting the finger 120 from an initial position in an outward direction thereof, for reception of the cup 10, in a state in which the support 130 is moved downwards after withdrawal of the holder body 110 of the cup holder 100 from the armrest 4, the locking member 140 engaged with the finger 120 is linearly moved, compressing the corresponding spring 144. In the instant state, the stopper of the locking member 140 locks the link 131, preventing pivotal movement of the link 131.

In the diverged state of the finger 120 as described above, the user inserts the cup 10 into the receiving space C between the finger 120 and the holder body 110 such that the cup 10 is laid on the support 130. Since upward movement of the support 130 is prevented in the state in which the stopper 142 locks the link 131 to prevent pivotal movement of the link 131, there is no situation in which the cup 10 laid on the support 130 is separated from the cup holder 100 due to upward movement of the support 130.

Even when the support 130 comes into contact with the seat cushion 3 as the seatback 2 is folded during a walk-in operation of the seat 1, the support 130 is maintained in a fixed state without moving upwards under the condition that the cup 10 is received in the receiving space C. When the seatback 2 is further folded in a state in which the support 130 is in fixed state without movement, as described above, only the armrest 4 is rotated with respect to the seatback 2. In the instant case, accordingly, separation of the cup 10 from the cup holder 100 may be prevented because the position of the support 130 is still fixed (cf FIG. 9).

Of course, in the state in which the cup 10 is received in the receiving space C between the finger 120 and the holder body 110, elastic force of the corresponding spring 144, which is in a compressed state, acts on the finger 120 via the locking member 140. In the instant case, the finger 120 supports the cup 10 in a state of pressing the side surface of the cup 10.

On the other hand, when the user removes the cup 10 from the receiving space C, the shape of the compressed spring 144 is elastically recovered, and accordingly, elastic resilience of the spring 144 linearly moves the locking member 140 in a reverse direction thereof. As a result, the stopper 142 of the locking member 140 is moved to an unlocking position, allowing pivotal movement of the link 131 and upward movement of the support 130.

Furthermore in accordance with linear movement of the locking member 140, the finger 120 engaged with the locking member 140 is again elastically pivoted to the initial position. Accordingly, the finger 120 is again maintained in a converged state in the holder body 110.

As described above, when one finger 120 is pivoted as the user inserts or removes the cup 10, the locking member 140 moves in linkage with movement of the finger 120. In the instant case, the locking member 140 moves to a locking position preventing pivotal movement of the link 131 or an unlocking position (an initial position) allowing pivotal movement of the link 131.

As apparent from the above description, in accordance with the vehicle cup holder according to various exemplary embodiments of the present invention, when one finger pivots to lay a cup on the support, the stopper of the locking member prevents pivotal movement of the link, and accordingly, the position of the support connected to the link is fixed. As a result, even when the support comes into contact with the seat cushion during a walk-in operation of the seat under the condition that the cup is received, it may be possible to prevent the support from moving upwards. Accordingly, cup separation caused by upward movement of the support may be prevented.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cup holder for a vehicle, the cup holder comprising:
    a holder body;
    a finger elastically and pivotably mounted to the holder body, and configured to press and support a side surface of a cup inserted into the cup holder with the holder body;
    a support connected to the holder body by a link so that the support is vertically movable in accordance with pivotal movement of the link, the support being configured to support a bottom portion of the cup; and
    a locking member disposed between the finger and the link,
    wherein the locking member is configured to lock the link when the finger is pivotally moved from an original position of the finger.

2. The cup holder according to claim 1, wherein the finger is coupled to the locking member by a gear structure configured to convert pivoting force of the finger into linear movement force of the locking member or to convert linear movement force of the locking member into pivoting force of the finger.

3. The cup holder according to claim 2,
    wherein the finger includes a first tooth portion of the gear structure, the first tooth portion is formed at a hinge coupling portion of the finger in a circumferential direction of the hinge coupling portion, and the hinge coupling portion of the finger is pivotally coupled to the holder body, and
    wherein the locking member includes a second tooth portion of the gear structure, and the second tooth portion is formed in a linear direction at the locking member and the second tooth portion is gear-engaged with the first tooth portion of the finger.

4. The cup holder according to claim 3, wherein the locking member is linearly moved to a position locking the link in accordance with pivoting of the finger in a state in which the first tooth portion and the second tooth portion are gear-engaged with each other.

5. The cup holder according to claim 3,
    wherein an elastic member is disposed between the hinge coupling portion of the finger and the holder body, to elastically pivot the finger.

6. The cup holder according to claim 5,
wherein when the cup received in the cup holder is removed in a state in which the elastic member has been deformed in accordance with pivoting of the finger for reception of the cup, the elastic member elastically pivots the finger in a reverse direction thereof, and at a same time, provides elastic resilience to move the locking member to an unlocking position.

7. The cup holder according to claim 1, wherein an elastic member is mounted between the locking member and the holder body, to provide elastic resilience to move the locking member to an unlocking position in a state in which the elastic member has been deformed by the locking member moving to a locking position.

8. The cup holder according to claim 7,
wherein the locking member includes a guide pin; and
whereinthe wherein the elastic member is disposed at the guide pin so that the elastic member is supported, at a first end portion of the elastic member, by the locking member while being supported, at a second end portion of the elastic member, by the holder body.

9. The cup holder according to claim 8,
wherein the guide pin is coupled to a guide protrusion formed at the holder body while passing through the guide protrusion; and
wherein the elastic member mounted at the guide pin is supported, at the first end portion of the elastic member, by the locking member while being supported, at the second end portion of the elastic member, by the guide protrusion of the holder body.

10. The cup holder according to claim 1,
wherein a stopper is formed at a first side of the locking member; and
wherein when the locking member moves to a locking position, the stopper of the locking member is moved to a position where the stopper contacts with an end portion of the link pivoting in a pivoting direction thereof, to prevent pivoting of the link, causing the link to be locked.

11. The cup holder according to claim 10, wherein the stopper of the locking member is moved to a position where the stopper contacts with a tip portion of an end portion of the link pivotally coupled to the holder body, bring the tip portion of the link into contact with the stopper of the locking member in a locked state of the link.

12. The cup holder according to claim 11,
wherein the link is pivotally coupled, at a first end portion of the link, to the holder body,
wherein the link is coupled, at a second end portion of the link, to the support, and
wherein the stopper of the locking member moves to a position under a side surface of a sector gear formed at the tip portion of the end portion of the link, bring the side surface of the sector gear into contact with the stopper of the locking member in the locked state of the link.

13. The cup holder according to claim 1, wherein the cup holder mounting portion in the vehicle is an armrest end portion of a seat in the vehicle.

14. The cup holder according to claim 13, wherein the cup folder including the finger, the support, the locking member, and the holder body is a slidable insertion type cup holder, wherein the finger, the support, the locking member, and the holder body are inserted into an interior of the armrest end portion of the seat through sliding movement thereof, or are withdrawn forwards from the armrest end portion through sliding movement thereof.

\* \* \* \* \*